M. W. FARBER.
Road-Scraper.
No. 211,561. Patented Jan. 21, 1879.
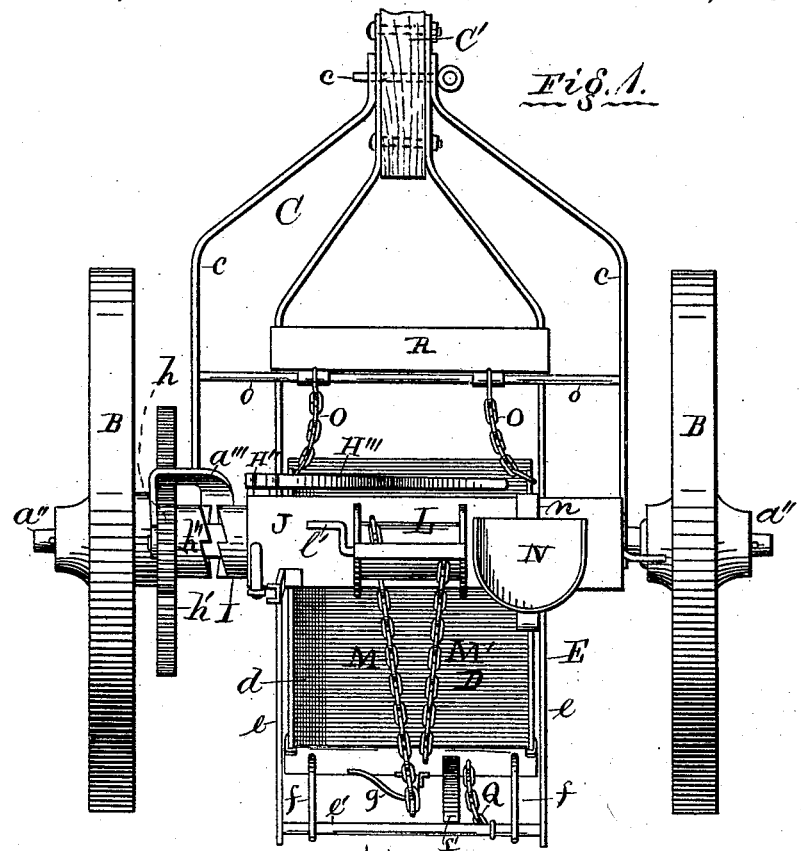
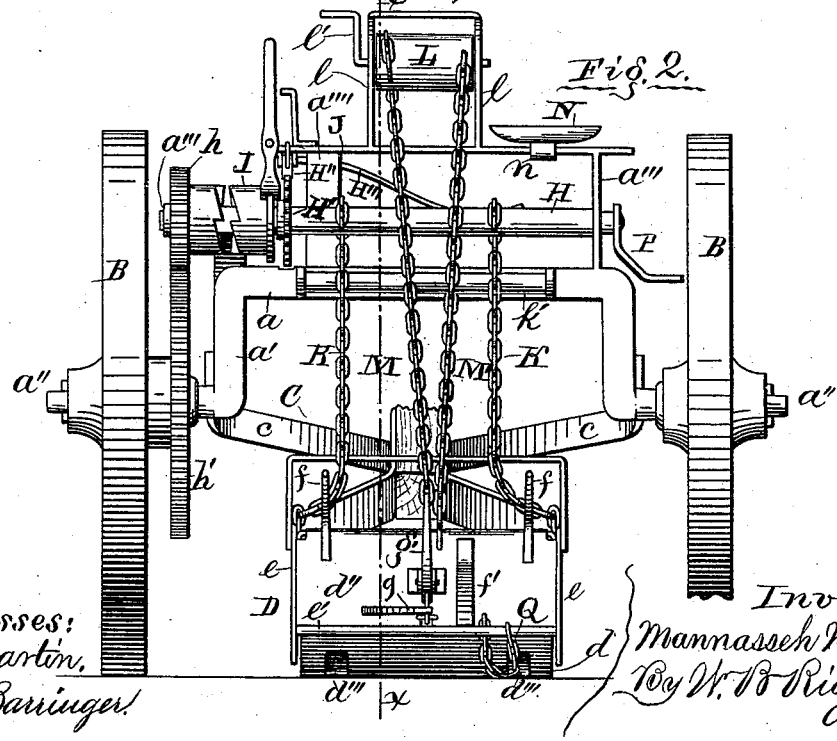
Witnesses:
J. M. Martin.
M. H. Barringer.
Inventor:
Mannasseh W. Farber,
By W. B. Richards,
Atty.

3 Sheets—Sheet 2

M. W. FARBER.
Road-Scraper.

No. 211,561.  Patented Jan. 21, 1879.

Witnesses:
M. H. Barringer
J. M. Martin

Inventor:
Mannasseh W. Farber,
By W. R. Richards,
Atty.

N. PETERS, PHOTO-LITHOGRAPHER, WASHINGTON, D. C.

M. W. FARBER.
Road-Scraper.

No. 211,561.   Patented Jan. 21, 1879.

3 Sheets—Sheet 3.

Witnesses:
M. K. Barringer
J. M. Martin

Inventor:
Mannasseh W. Farber
By W. B. Richards,
Atty.

UNITED STATES PATENT OFFICE.

MANNASSEH W. FARBER, OF MOUNT PLEASANT, IOWA, ASSIGNOR OF TWO-THIRDS HIS RIGHT TO JESSE STUBBS AND CHAS. H. SMITH, OF SAME PLACE.

IMPROVEMENT IN ROAD-SCRAPERS.

Specification forming part of Letters Patent No. 211,561, dated January 21, 1879; application filed July 5, 1878.

*To all whom it may concern:*

Be it known that I, MANNASSEH W. FARBER, of Mount Pleasant, in the county of Henry and State of Iowa, have invented certain new and useful Improvements in Wheeled Road-Scrapers; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 3:
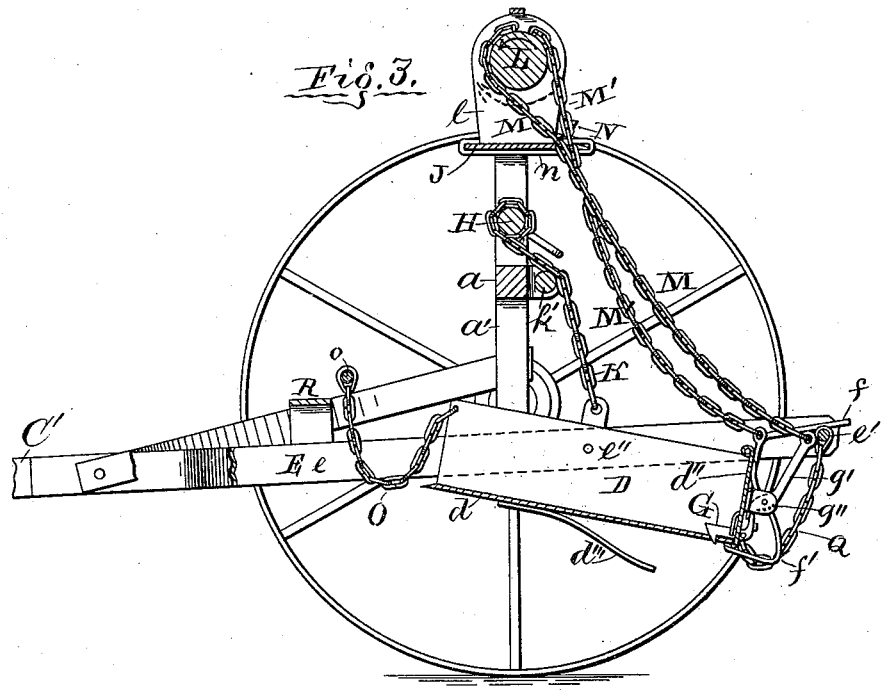
Figure 4:
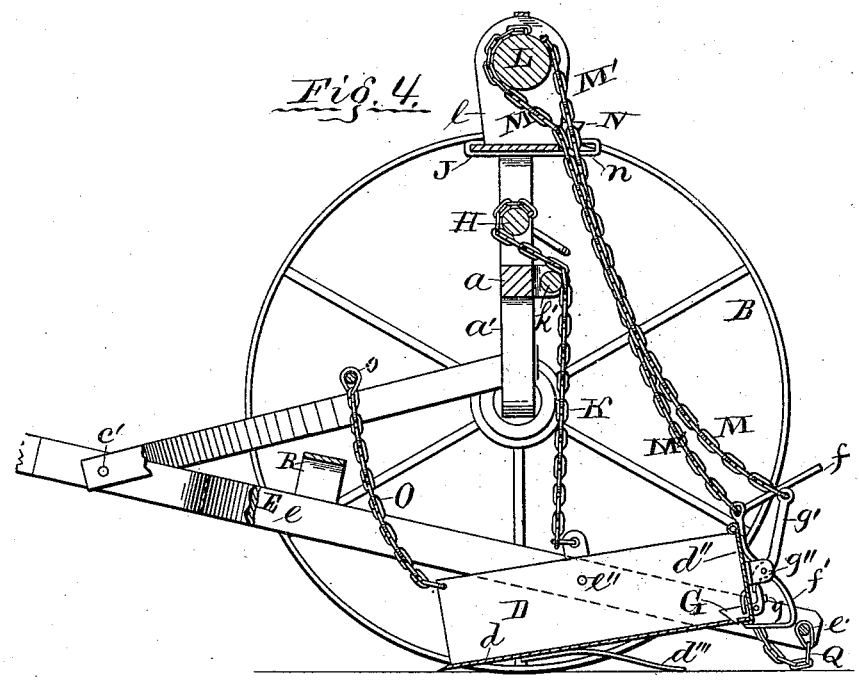
Figure 5:
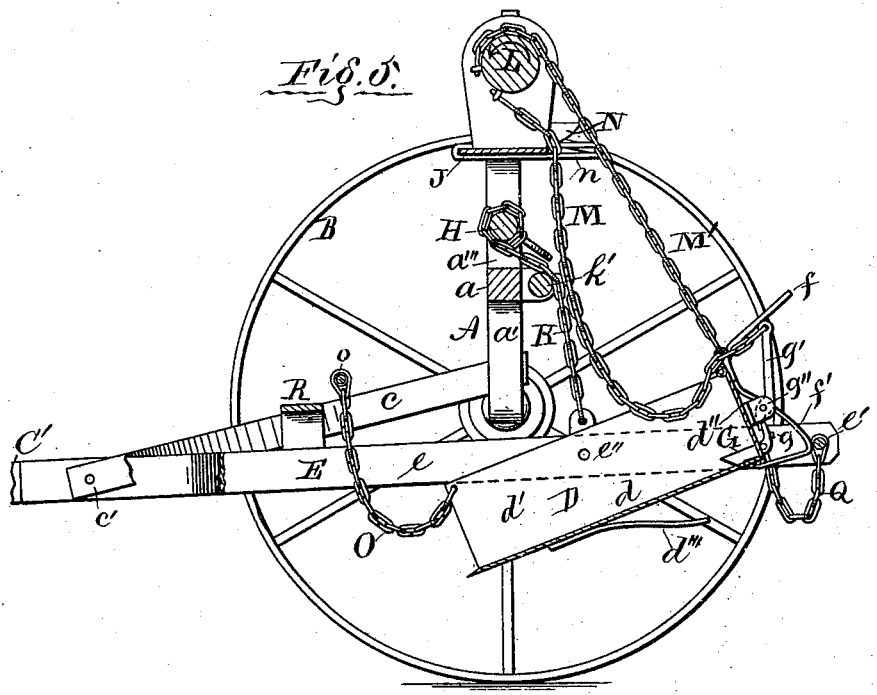
Figure 6:
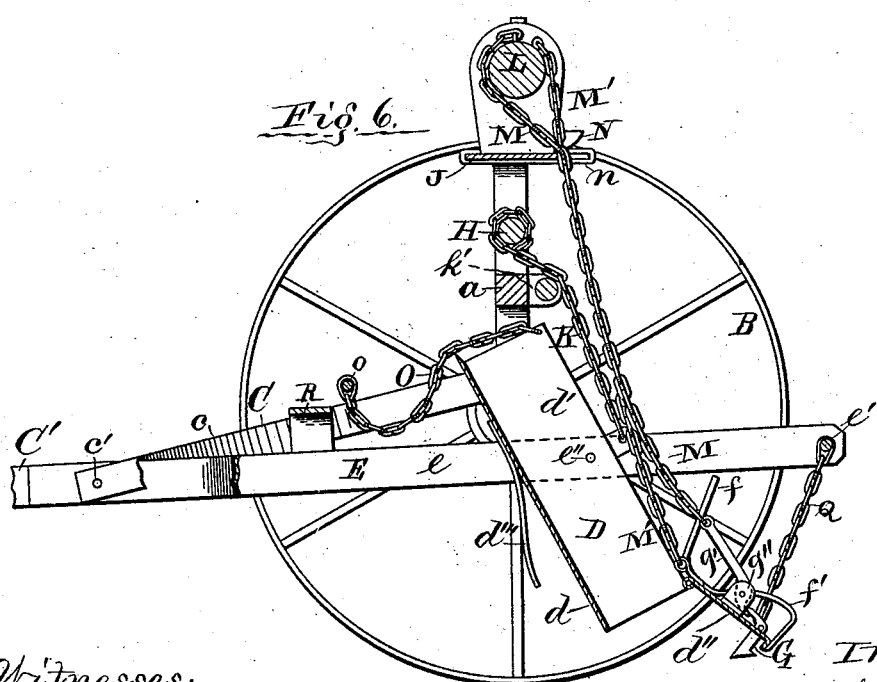

Figure 1 is a top-plan view of a machine embodying my invention. Fig. 2 is a rear elevation, showing one wheel partly broken away. Fig. 3 is a sectional view in the line $x\ x$, Fig. 2, but showing the parts in different relative positions from Fig. 2. Fig. 4 is a sectional view of Fig. 2 in the line $x\ x$. Fig. 5 is a sectional view in the line $x\ x$, Fig. 2, but showing the parts in different positions from Fig. 2. Fig. 6 is a sectional view in the line $x\ x$ in Fig. 2, the parts shown in different positions.

This invention relates to a road-scraper carried on wheels, to which it is adjustably attached, so that it can be readily lowered to load with dirt, elevated to transport the load, and tilted backward or forward to discharge it.

The invention consists in certain improvements in road-scrapers, hereinafter more fully set forth.

The invention further relates to features of construction and combinations, hereinafter fully described, and set forth in the claims hereto annexed.

Referring to the drawings by letters, the same letter indicating the same part in the different views, letter A represents the axle, with centrally elevated part $a$, vertical side portions $a'$, and end portions $a''$, on which the supporting-wheels B are journaled. C is a yoke, formed of bars $c\ c$, connected at their rear ends to the parts $a'$ of the axle, and their forward ends converging and journaled at $c'$ to the draft-pole $C'$, near its rear end. D is the scraper-box, having a bottom, $d$, with forward cutting-end, sides $d'$, and rear end, $d''$, hinged to the sides $d'$, so that the end $d''$ may swing open, as shown at Fig. 6. E is a frame, formed of side bars $e$, their forward ends converging and bolted to the rear end of the draft-pole $C'$, and their rear ends connected by a bar, $e'$.

The scraper-box D is suspended between the bars $e$ by trunnions $e''$, so that it can be tilted by raising either its forward or rear end, and has spring-plates $d'''$ on its bottom.

The end $d''$ has arms $f\ f$ projecting from its rear side and upper edge, and a cam-surface, $f'$, on its rear side.

G is an elbow-lever latch, pivoted at its angle in the end $d''$, through which it passes, so that its forward latch end may engage with a hole in the bottom $d$, into which it is pressed by a spring, $g$, which acts on its outer end. $g'$ is a lever, pivoted between standards $g''$, which project from the end $d''$, and its lower end resting between end $d''$ and the outer end of lever G.

H is a shaft, journaled in standards $a'''$, which project upward from the axle A, and has on its outer end a loose pinion, $h$, which gears with a pinion, $h'$, which is attached to one of the wheels B. I is a sliding clutch on the shaft H, which may be slid over to engage with a clutch, $h''$, attached to the loose pinion $h$, to rotate the shaft H. H$'$ is a ratchet-wheel on the shaft H, and H$''$ is a detent-pawl, which engages the same, and may be thrown into engagement with the ratchet by a spring, or out of gear therewith by a foot-lever, H$'''$. The pawl H$''$ is journaled to a bar, J, which is supported on standards $a'''$ and $a''''$, above the axle A. K K are chains, extending from the shaft H, one to each bar $e$, near the trunnions $e''$, and pass over an anti-friction roller, $k'$, on the axle A. L is a short shaft or windlass, journaled in standards $l$, above the bar J, and provided with a crank, $l'$. M M$'$ are chains, wound in opposite directions on the shaft L, the one, M, extending downward and connected with the upper end of the lever $g'$, and the other, M$'$, extending downward and connected with the upper edge of the end $d''$ of the scraper. N is the driver's seat, secured to a loop, $n$, which is placed on the bar J, as shown in the drawings, so that it may be slid backward or forward to enable the driver to use his weight to balance the machine.

When the scraper-box is loaded and elevated the driver's seat is slipped forward on the bar J by sliding the loop thereon, so that the weight of the driver will counterbalance the weight of the load.

When the box is being filled the weight of the driver is thrown to the rear to force the edge of the scraper into the soil, which is done by sliding the loop $n$ backward on the bar J.

O O are chains pendent from a bar, $o$, which connects the bars $c$, and their lower ends attached to the sides and forward ends of the scraper-box D. The chains O, and, in fact, all of the chains herein described, should be made of removable links, or otherwise adjustable in length.

In operation, the machine is moved to the place to be loaded, with the scraper-box in an elevated position, as shown at Fig. 3, and the clutches I $h''$ disengaged. The detent-pawl H'' is then disengaged from the ratchet H', and the weight of the scraper-box will rotate the shaft H, and allow the box D to lower to the position shown at Figs. 1, 2, and 4, in which position, its rear end being held highest by the springs $d''''$, its forward end will be forced into the dirt and the box loaded by the forward motion of the machine, drawn by draft-animals, attached to the draft-pole. The chains O O may be adjusted to prevent the forward end of the scraper from running too deep.

When the box D is loaded it may be elevated to the position shown at Fig. 3 by throwing the clutch I into gear with the clutch $h''$, which will allow the wheel B to rotate the shaft H, and, by winding up the chains K, raise the frame E and the scraper-box. A crank, P, on the shaft H may be used by hand to aid in rotating the shaft H.

When the box is elevated to about the position shown at Fig. 3, the clutches I $h''$ may be disengaged, and the detent-pawl H'' will then engage with the ratchet H' and retain the box in this elevated position, in which position the machine may be drawn to any desired place; and if desired to unload it at its forward end, it may be done by turning the shaft L in the direction shown by the full-line arrow at Figs. 3 and 5, and winding up the chain M' to elevate the rear end of the box D, as shown at Fig. 5, or higher, and allow its load to discharge.

If desired to unload the box at its rear end, it may be done by turning the shaft L in the direction shown by the dotted-line arrow at Fig. 3, which will draw upon the chain M, and thereby draw the upper end of the lever $g'$ inward, which will act on the lever G and raise its inner latch end from its seat in the bottom of the box D. Releasing the shaft L will then allow both chains, M M', to slacken, and, the rear end of the scraper-box being the heaviest, it will tilt backward, as shown at Fig. 6, and the end $d''$ swing out and allow the load to discharge. Then by turning the shaft L to draw upon the chain M', the rear end of the box D may be again elevated, and as it is elevated the cam-surface $f'$, striking the bar $e'$, will press the end $d''$ inward until the latch-lever G catches in the bottom $d$ and again secures it. The chain M' is then slackened, and the rear end of the box D will again lower to the position shown at Fig. 3, where it will be supported by the arms $f$, resting on the bar $e'$, and is in position to be again carried on the wheels B to the place of loading.

When the box D is tilted, as shown at Fig. 6, the chain Q will hold the end $d''$ open and limit the movement of the box.

The driver may rest his feet on the bar R.

What I claim as new, and desire to secure by Letters Patent, is—

1. The tilting scraper-box D, hinged to the frame E, and provided with the arms $f\,f$, in combination with the frame E, hinged to the yoke C, and provided with the rear cross-bar, $e'$, substantially as described, and for the purpose set forth.

2. The tilting scraper-box D, hinged to the frame E, in combination with the frame E, hinged to the yoke C, shaft H, ratchet-wheel H', pawl H'', foot-lever H''', chains K, and clutch $h''$ I, whereby the scraper-box may be elevated and held in its elevated position, substantially as described, and for the purpose set forth.

3. The tilting scraper-box D, hung in a suspending-frame, E, and provided with the rear hinged end, $d''$, in combination with the windlass L and chains M M', whereby the scraper-box may be unloaded from either end, substantially as described, and for the purpose set forth.

4. The tilting scraper-box D, hung in a suspending-frame, E, and provided with a rear hinged end, $d''$, in combination with the shaft H and chain K, for elevating the scraper-box, and windlass L, with chains M M', for discharging the load at either end, substantially as described.

5. The chain M, arranged to operate with the shaft L and the hinged end $d''$, and spring-latch $g'$ G, substantially as described, and for the purpose specified.

6. The shaft L, arranged to operate with the chains M M', wound thereon in opposite directions, and with the hinged scraper-box D and its hinged end $d''$, and the latch mechanism, substantially as and for the purpose specified.

7. The handles $f$, arranged to operate with the hinged scraper-box, having hinged end $d''$, and with the bar $e'$ of the frame E, substantially as and for the purpose specified.

8. The hinged end $d''$ of the tilting scraper-box, provided with the latch G $g'$, and having the cam surface or projection $f'$, arranged to operate with the bar $e'$, substantially as described, and for the purpose set forth.

9. The springs $d'''$, arranged to operate with the scraper-box D, substantially as and for the purpose specified.

10. The seat N and loop $n$, in combination with the bar J, and arranged to operate substantially as described, and for the purpose set forth.

11. The chain Q, arranged to operate with the tilting scraper-box, having hinged end $d''$, substantially as and for the purpose specified.

In testimony that I claim the foregoing as my own I affix my signature in presence of two witnesses.

MANNASSEH W. FARBER.

Witnesses:
   H. AMBLER,
   R. AMBLER.